(12) United States Patent
Kataoka

(10) Patent No.: US 6,335,604 B1
(45) Date of Patent: Jan. 1, 2002

(54) DC MOTOR DRIVE UNIT AND MOTOR-DRIVEN POWER STEERING CONTROL APPARATUS

(75) Inventor: Motoaki Kataoka, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/551,723

(22) Filed: Apr. 18, 2000

(30) Foreign Application Priority Data

May 18, 1999 (JP) .......................................... 11-137019

(51) Int. Cl.⁷ .............................................. G05B 11/36
(52) U.S. Cl. ...................................... 318/609; 180/6.44
(58) Field of Search ................................ 318/609, 610; 180/6.44

(56) References Cited

U.S. PATENT DOCUMENTS

| | | | | |
|---|---|---|---|---|
| 4,666,011 A | * | 5/1987 | Ohe et al. ..................... | 180/446 |
| 4,779,708 A | * | 10/1988 | Sasao et al. | |
| 4,869,334 A | * | 9/1989 | Marumoto et al. ......... | 180/446 |
| 4,940,107 A | * | 7/1990 | Hanisko ..................... | 180/446 |
| 5,341,891 A | * | 8/1994 | Wada et al. ............. | 318/434 X |
| 5,467,279 A | | 11/1995 | Wada et al. | |
| 5,631,529 A | * | 5/1997 | Shimizu et al. ......... | 180/446 X |
| 5,740,880 A | * | 4/1998 | Miller ......................... | 180/446 |
| 5,912,539 A | * | 6/1999 | Sugitani et al. ............. | 318/434 |
| 5,978,721 A | * | 11/1999 | Kagawa et al. | |
| 6,026,926 A | * | 2/2000 | Noro et al. .................. | 180/446 |

FOREIGN PATENT DOCUMENTS

JP          10-203384          8/1998

* cited by examiner

Primary Examiner—Jeffrey Donels
(74) Attorney, Agent, or Firm—Law Offices of David G. Posz

(57) ABSTRACT

A power assist motor drive unit includes an H-bridge circuit, current detecting means, and current control means for carrying out a PI feed back control according to a difference between the absolute values of a command current value and a actual motor current, thereby controlling the H-bridge circuit. The current control means includes PI operation control means and compensation-term-operation means for resetting a integral compensation term to a suitable value when operation of the power assist motor is changed from one state to another.

8 Claims, 14 Drawing Sheets

DC MOTOR DRIVE UNIT AND MOTOR-DRIVEN POWER STEERING CONTROL APPARATUS

CROSS REFERENCE TO RELATED APPLICATION

The present application is based on and claims priority from Japanese Patent Application Hei 11-137019 filed May 18, 1999, the contents of which are incorporated herein by reference.

BACKGROUND OF THE INVENTION

1. Field of the Invention

The present invention relates to a DC motor-assisted power steering apparatus.

2. Description of the Related Art

A power assisting DC motor (hereinafter referred to as P.A. motor) of an ordinary motor-assisted power steering apparatus is driven by a motor drive unit which has a H-bridge circuit, a current detecting circuit, and current control means. The H-bridge circuit has four power transistors to supply the DC motor with pulse-width-modulated-drive-current. The current detecting means detects drive current of the DC motor. The current control means controls the H-bridge circuit in a PID (proportional integral derivative) control on the basis of a difference between a command current value and an actual drive current.

The command current value is provided according to a steering torque signal and a vehicle speed signal. An ordinary current control means controls a motor drive circuit in the manner of pulse width modulation (hereinafter referred to as PWM-control) on the basis of the command current value and the detected actual current value of the P.A. motor. In the current control means, PI (proportional integral) feedback control is carried out by the PI control operation means on the basis of the current difference between the command current value and the actual current value to determine a duty ratio. In addition, a direction command value is provided to indicate the direction of the command current value.

However, if the PI feedback control is repeated according to an integration formula having an integral compensation term, the integral compensation term may increase to a value that cannot be neglected due to accumulation. As a result, a large impulsive drive current may flow in the P.A. motor, thereby causing a large impulsive torque or vibration applied on the steering wheel.

Therefore, driving feels unnatural due to unpleasant bumps on the steering wheel.

JP-A 10-203384 discloses a motor-assisted power steering apparatus which basically carries out a digital feedback control on the basis of a difference between command current value and actual current value. If an actual current value is excessively large, it is limited to a predetermined value, while an internal parameter is changed, so that the response characteristic of the steering can be improved.

Although the duty ratio is limited when power assisting motor (P.A. motor) is reversed, a considerable amount of the accumulated portion corresponding to the integral term still remains. As a result, abnormal-current detecting means may be erroneously operated, or the DC motor may suddenly vibrate due to an excessive amount of impulsive current flows in the P.A. motor when it is reversed. This results in bumps on the steering wheel during the reversal of steering operation, thereby giving the driver an unpleasant feeling.

SUMMARY OF THE INVENTION

Therefore, the present invention has an object of providing a P.A. motor drive unit in which an impulse drive current, shocking motion, or vibration is restrained even when the P.A. motor is reversed.

Another object of the invention is to provide a motor-assisted power steering apparatus adopting the P.A. motor drive unit.

According to a feature of the invention, a P.A. motor drive unit for driving a P.A. motor according to a command current value includes an H-bridge circuit for supplying PWM-controlled drive current, current detecting means for providing an actual current value, and current control means for carrying out a PI feed back control according to difference between the absolute values of the command current value and the actual current value. In the above motor drive unit, the current control means is comprised of PI operation control means for providing a PI control equation having an integral compensation term, and compensation term operation means for resetting the integral compensation term to a suitable value when operation of the P.A. motor is changed from one state to another.

Even if the integral compensation term increases when the P.A. motor is reversed or changed to operate in a different state, integral compensation term is forced to reset to a value close to zero or a negative value. Accordingly, a large impulsive drive current may not be generated since the duty ratio of the drive current is controlled to be small. As a result, the response characteristic of the drive current to the command current value is improved, and the P.A. motor can operate smoothly. Since an impulsive large drive current is restrained, an erroneous operation of a fail-safe means can be prevented when detecting abnormal current. Moreover, since an impulsive current change is restrained, EMI trouble due to radiation of noises to the surrounding devices can be restrained.

In the P.A. motor drive unit as defined above the change of operation of the P.A. motor is judged by a change of the symbol of the command current value.

In the above defined P.A. motor drive unit, the compensation term is reset when the symbol of the command current value is changed and the direction of the command current value becomes different from the rotation direction of P.A. motor.

If the integral compensation term is reset only at the state of operation of the P.A. motor when such excessive accumulation may very likely occur, linearity of the control system will be maintained.

In the P.A. motor drive unit as defined above, the compensation term is reset when the P.A. motor is started or when it is restarted after an emergency stop due to an abnormal operation.

According to another feature of the invention, a power steering control apparatus for a vehicle is comprised of command current operation means for providing a command current value according to a steering torque applied to a steering shaft and a vehicle speed, the P.A. motor drive unit defined above, and a P.A. motor.

If the operation of the P.A. motor is changed, bump is prevented from being applied to the steering wheel. As a result, the feeling of the steering vehicle is improved. Because an abrupt change of the impulsive drive current is restrained, surrounding devices are not negatively affected by radiation of the noises, including EMI.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

Figure 1:
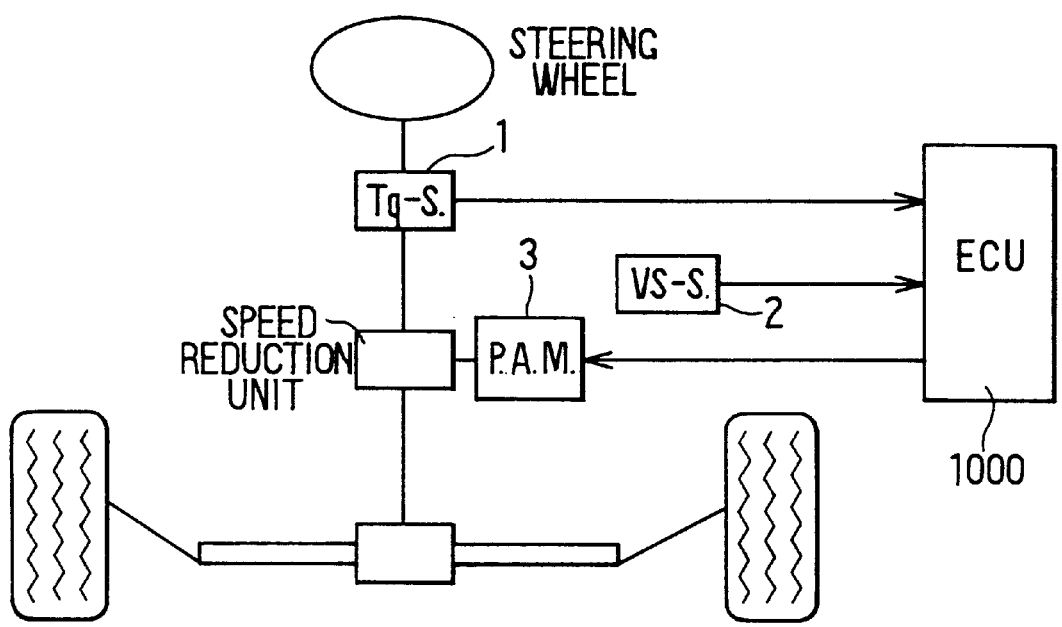
FIG. 1 is a schematic diagram of a motor-assisted power steering system, which includes a P.A. motor drive unit according to a first embodiment of the invention.
Figure 2:
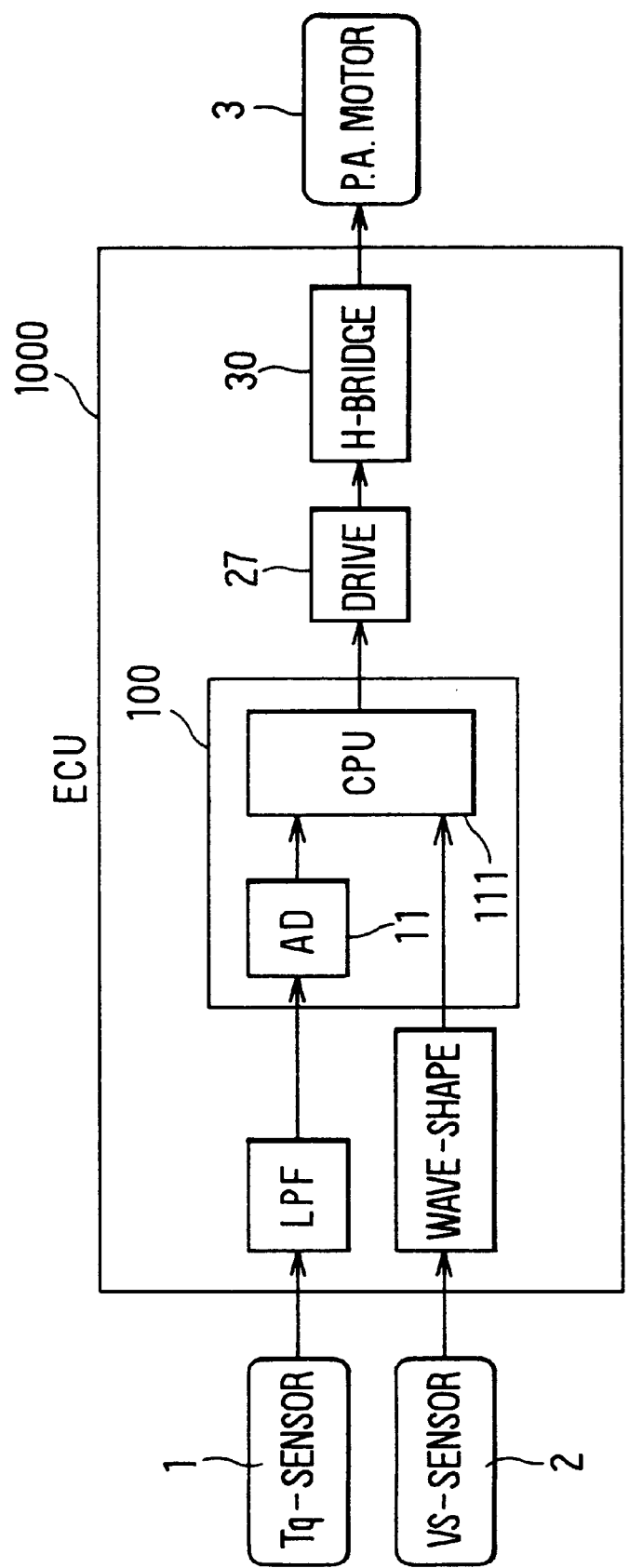
FIG. 2 is a block diagram of a power steering control apparatus according to the first embodiment.

As shown in FIG. 1, a motor-assisted power steering apparatus according to a first embodiment of the invention includes ECU 1000, which controls P.A. motor 3 on the basis of a signal from steering torque sensor 1 and a signal from vehicle speed sensor 2. P.A. motor 3 assists, via a speed reduction unit, steering torque applied to a steering wheel by a driver to change the direction of vehicle wheels. As shown in FIG. 2, ECU 1000 includes LPF (low pass filter), a wave-shaping circuit, microcomputer 100 having A-D converter 11 and CPU 111, drive circuit 27, and H-bridge circuit 30. ECU 1000 controls P.A. motor 3 to increase steering torque in response to driver's steering of a steering wheel. ECU 1000 changes the drive or rotation direction of P.A. motor 3 according to the positive or negative symbol of a command current value, which is mainly related to an output signal of steering torque sensor 1.

Figure 3:
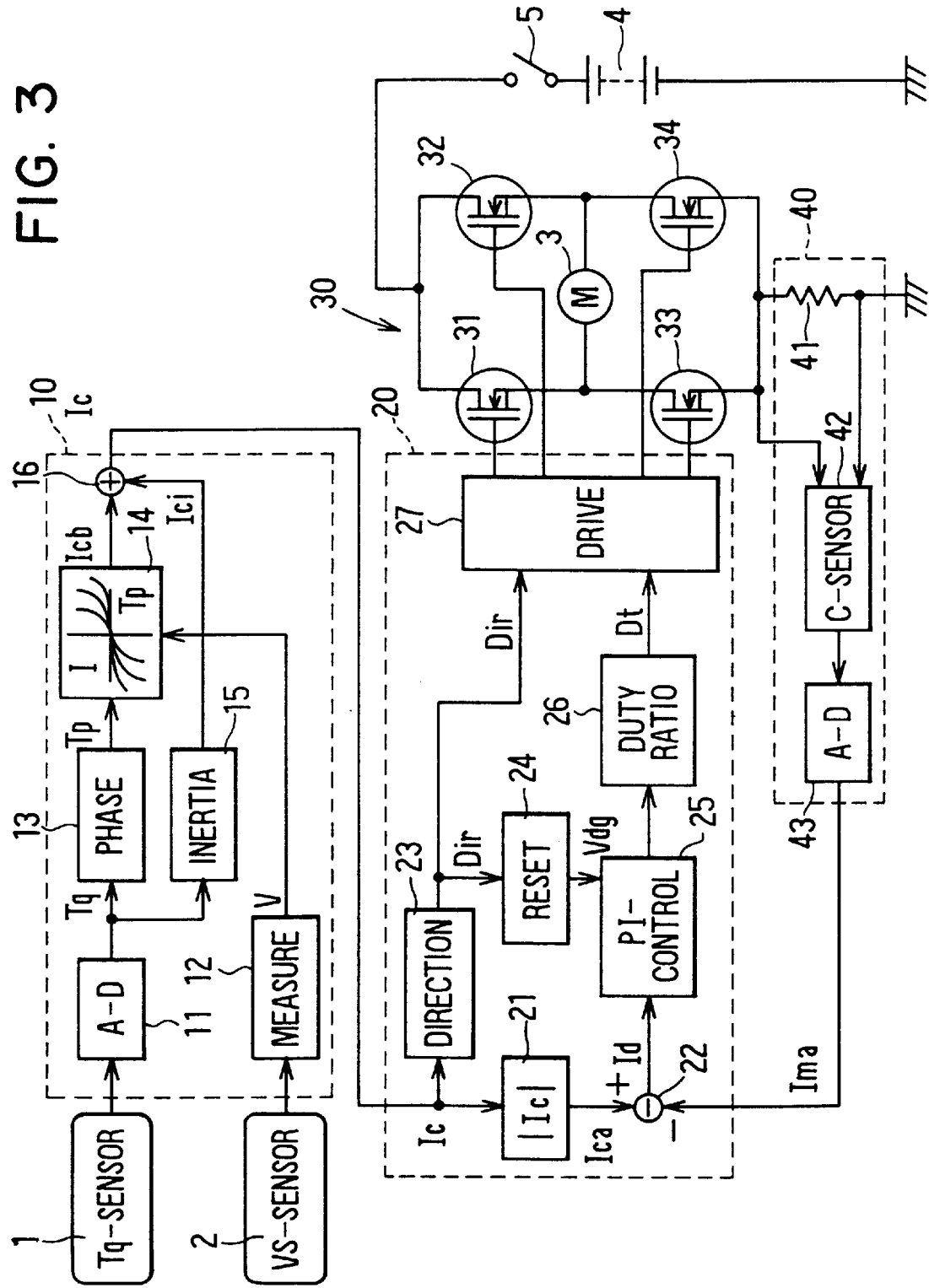
FIG. 3 is a block diagram of the power steering apparatus according to the first embodiment.

As shown in FIG. 3, the power steering apparatus is functionally comprised of command current value unit 10, current control unit 20, H-bridge circuit 30, and current detecting unit 40. Current control unit 20, H-bridge circuit 30, and current detecting unit 40 form a P.A. motor drive unit according to the present embodiment of the invention. ECU 1000 includes this P.A. motor drive unit. In other words, ECU 1000 includes current control unit 20, the P.A. motor drive circuit having H-bridge circuit 30 and current detecting unit 40, and command current value unit 10.

Command current value unit 10 provides a command current value according to a steering torque signal Tq that corresponds to a torque applied to a steering shaft and a vehicle speed signal V that corresponds to a vehicle having wheels to be steered. Command current value unit 10 includes A-D converter 11, pulse measuring means 12, phase-compensation means 13 operated by software stored in CPU 111, current map 14, inertia compensation means 15, and adding means 16.

After noises are removed by low-pass filter LPF, the output signal of steering torque sensor 1 is converted into a digital signal A-D converter 11 to be inputted to phase compensation means 13 and inertia compensation means 15 as a steering torque signal Tq.

The torque signal Tq that is inputted into phase compensation means 13 is compensated to advance in phase by a digital calculation. The digital calculation corresponds to the following transfer function: $H(s)=(\tau s+1)/(A\tau s+1)$, and is converted to a compensation torque signal Tp that is inputted into current map 14.

If a vehicle speed signal from vehicle speed sensor 2 interrupts CPU 111 via the wave shaping circuit, pulse operation means 12 calculates a vehicle speed signal V on the basis of time elapsed from the last vehicle speed pulse. The vehicle speed signal V is also inputted to current map 14 together with the compensation torque signal Tp. Current map 14 provides a basic command current value Icb for the steering assisted by an interpolation or a functional calculation. The basic command current value Icb becomes larger as the compensation torque signal Tp increases and becomes smaller as the vehicle speed V increases.

Regarding the steering torque signal Tq inputted to inertia compensation means 15, a difference thereof corresponding to a derivative value is multiplied by a suitable gain and outputted from inertia compensation means 15 as an inertia-compensated command current value Ici. Subsequently, the basic command current value Icb and the inertia-compensated command current value Ici are added to provide a command current value Ic=Icb+Ici.

Current control unit 20 is an electronic unit that controls H bridge circuit 30 according to the command current value Ic and the detected or actual drive current Ima (that is an absolute value) supplied to P.A. motor 3 from current detecting unit 40. In other words, current control unit 20 is comprised of respective software operation means 21–26 formed by CPU 111 and drive circuit 27, and is controlled according to the direction command value Dir and duty ratio Dt provided by the same software operation means.

The command current value Ic is inputted to absolute value operation means 21 and to direction command means 23 that are included in current control unit 20. Direction command means 23 sets the direction command value Dir that indicates the rotation direction of P.A. motor 3 to one of −1, 0, and 1 according to the positive or negative symbol of the command current value Ic and supplies it to compensation term reset means 24 and to drive circuit 27. During this process Dir=1 represents the normal direction command, Dir=0 represents the stop command and Dir=−1 represents the reversal command.

Absolute value operation means 21 calculates a command current value Ica that is the absolute value |Ic| of the command current value Ic, which is sent to subtraction means 22. Subtraction means 22 subtracts the above-stated detected drive current Ima (that is an absolute value) from the command current value Ica to provide a current deviation Id, which is sent to PI control means 25.

PI control means 25 performs a proportional-integration feedback-control-calculation according to the current deviation Id (=Ica−Ima) to calculate an appropriate limited drive voltage Vdg, which is sent to duty ratio operation means 26. At this stage, compensation term reset means 24 provides a reset command signal that is supplied to PI control means 25 when the symbol of the command current value Ic is changed between positive and negative in response to the direction command value Dir.

Consequently, PI control means 25 resets the proportional integral term, which has accumulated by then to zero, to a small positive or small negative value. Duty ratio operation means 26 calculates a duty ratio Dt between 0 and 100% according to the appropriately set limit drive voltage Vdg and sends it to drive circuit 27.

Drive circuit 27 controls H-bridge circuit 30 according to the direction command value Dir and the duty ratio Dt. In other words, drive circuit 27 performs the pulse width modulation (PWM) according to the direction command value Dir and the duty ratio Dt and drives P.A. motor 3 by turning on and off MOS-FETs 31–34.

H-bridge circuit 30 has four MOS-FETs 31–34, which are disposed around P.A. motor 3 and connected to one another in the shape of the letter H. H-bridge circuit 30 is applied a certain voltage via relay 5. MOS-FETs 31–34 are turned on or off by the PWM signal so that H-bridge circuit 30 can drive P.A. motor 3 in a designated direction.

Current detecting unit 40 includes shunt resistor 41 connected between an end of H-bridge circuit 30 and ground, operational amplifier 42 for detecting the drive current of P.A. motor 3 by a voltage drop across shunt resistor 41 and A-D converter 43 for converting the output signal of operational amplifier 42 into a digital signal. The digital current value Ima is supplied to a subtraction means 22 of current control unit 20 as a feedback signal.

Thus, the power steering control apparatus includes command current value unit 10, current control unit 20, H-bridge circuit 30 and current detecting unit 40. H-bridge circuit 30 supplies pulse-width-modulated drive current to DC P.A. motor 3 to drive the same. On the other hand, current detecting unit 40 is an electronic circuit that detects the absolute value of the drive current of P.A. motor 3 to provide the detected current value Ima.

Current control unit 20 performs PI feedback control according to the absolute value Ica of the command current value and the current deviation Id=Ica−Ima. Subsequently, a duty ratio Dt and the direction command value Dir are provided to control H-bridge circuit 30. At this stage, current control unit 20 has compensation-term-reset means 24, which resets the proportional integral compensation term to a suitable reset value Vrst when the operation of P.A. motor 3 is changed from one condition to another in a prescribed manner.

The change of the operation can be detected when the symbol of the command current value changes between either positive or negative, and when the reset value Vrst is zero or a value smaller than a positive value or larger than a negative value.

Figure 4:
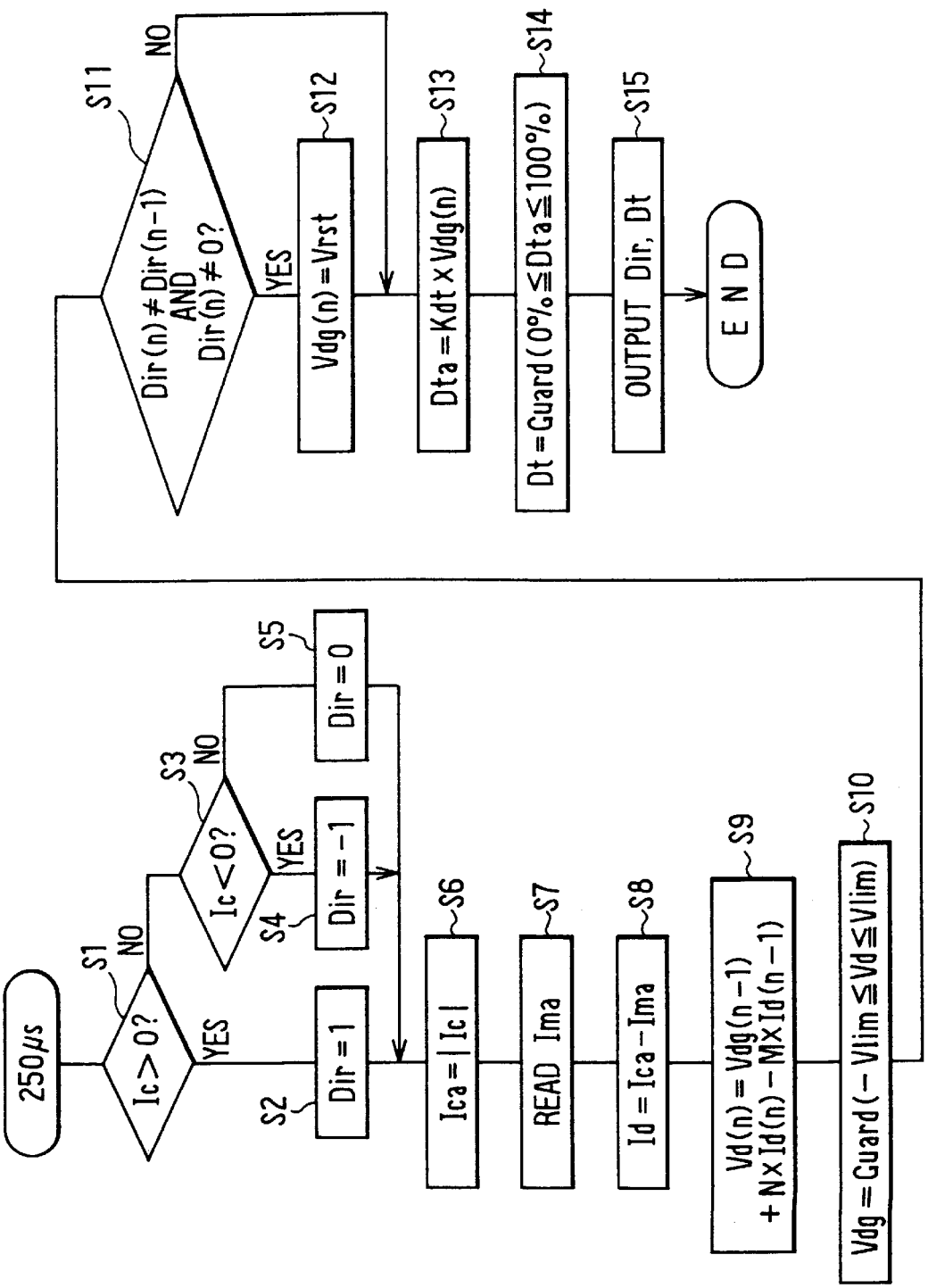
FIG. 4 is a flow diagram of a control logic of the P.A. motor drive unit according to the first embodiment.

The power steering control apparatus functions according to the following control logic, as shown in FIG. 4.

This control logic is started when microcomputer 111 is interrupted every 250 μ sec. The direction command value Dir and the duty ratio Dt are provided according to the command current value Ic and the detected current value Ima.

At steps S1–S5, a direction command operation is carried out, and the direction command value Dir is provided according to the command current value Ic. If Ic>0, then Dir=1; if Ic=0, then Dir=0; and if Ic<0, then Dir=−1.

At steps S6–S10, the limited drive voltage Vdg is calculated from the command current value Ic and the detected current value Ima. In other words, the absolute value Ica=|Ic| is calculated by absolute value operation means 21 at step S6, and the detected current value Ima is read at step S7. At the next step S8, the current deviation Id=Ica−Ima is calculated by subtraction means 22. At step S9, PI feedback operation by the current deviation Id is performed according to the limited drive voltage Vdg, which is guarded in a discrete-time by control means 25 so that the drive voltage Vd can be provided from the following formula.

$$[F1] Vd(n) = Vdg(n-1) + N\, Id(n) - M\, Id(n-1)$$

Here, N and M are proportional integration coefficients for the PI feedback control performed during discrete-time; (n) represents a present value; and (n−1) represents a last value.

At step S10, the limited drive voltage Vdg is provided so that the range of the drive voltage Vd(n) is limited by PI control means 25 within Vlim. In other words, if Vd(n) is smaller than −Vlim or larger than Vlim, Vdg(n) is limited to ±Vlim and, otherwise, Vdg (n) is set equal to Vd(n).

Then, at steps S11 and S12, when the operation of P.A. motor 3 is changed from one condition to another, the compensation term Vdg(n) is reset to a predetermined voltage Vrst. That is, a judgement is made by compensation term reset means 24 at judging step S11, and step S12 follows only if Dir(n) Dir(n−1) and Dir(n) 0. Otherwise, step S12 is skipped. At step S12, the limited drive voltage Vdg is reset by PI control means 25 to a predetermined voltage Vrst (e.g. zero) only if the symbol of the command current value Ic is changed from one to the other, or from the neutral (i.e. Ic=0) to the negative or the positive.

At steps S13–S15, the duty ratio Dt is set, and the direction command value Dir and the duty ratio Dt is outputted. At step S13, duty ratio operation means 26 multiplies the limited drive voltage Vdg and a positive coefficient Kdt together to provide a provisional duty ratio Dta. Subsequently, at step S14, the duty ratio Dt is set within 0–100% on the basis of the provisional duty ratio Dta. That is: if Dta<0%, then Dt=0%; if Dta>100%, then Dt=100%; and otherwise, Dt=Dta. At the last step, the direction command value Dir and the duty ratio Dt are sent from direction command means 23 and duty ratio operation means 26 to drive circuit 27.

When the direction command value Dir and the duty ratio Dt are inputted to drive circuit 27, drive circuit 27 controls MOS-FETs 31–34 according to both the input signals. If the direction command value Dir is 1, drive circuit 27 turns off two MOS-FETs 32 and 33 and PWM-controls MOS-FETs 31 and 34, which turn on and off at the duty ratio Dt, so as to rotate P.A. motor 3 in the normal direction. If, on the other hand, the direction command value is −1, drive circuit 27 turns off two MOS-FETs 31 and 34 and PWM-controls MOS-FETs 32 and 33, which turn on and off at the duty ratio Dt, so as to rotate P.A. motor 3 in the reverse direction. If the direction command value Dir is 0, drive circuit 27 turns off all MOS-FETs 31–34 to cut current supplied to P.A. motor 3.

The above described formula F1 is formed as follows. In the PI feedback control operation, the current deviation Id is transferred via an internal value of a transfer function $G(s)=Kp+Ki/s$ to form a drive voltage $Vd(s)=G(s) Id(s)$. Here, Kp is a proportional gain, Ki is an integral gain, and s is the Laplace operator.

With operation cycle t, transfer function $G(s)$ is Z-transformed by the following bilinear transformation equation: $s=(2/t) (z-1)/(z+1)$ to provide a transfer function $G(z)$ at the discrete-time.

[F2]$G(z)=\{(Kp+Ki\ t/2)-(Kp+Ki\ t/2)\ z^{-1}\}/(1-z^{-1})$

The drive voltage Vd can be expressed by the formula F1 if $N=Kp+Ki\ t/2$, and $M=Kp-Ki\ t/2$, because the current deviation Id is transferred via the transfer function $G(z)$.

When the operation of P.A. motor 3 is changed, the limited drive voltage Vdg is reset to the reset voltage Vrst (e.g. zero). Even if the integral compensation term increases when P.A. motor 3 is reversed, the limited drive voltage Vdg is reset to zero.

Figure 5:
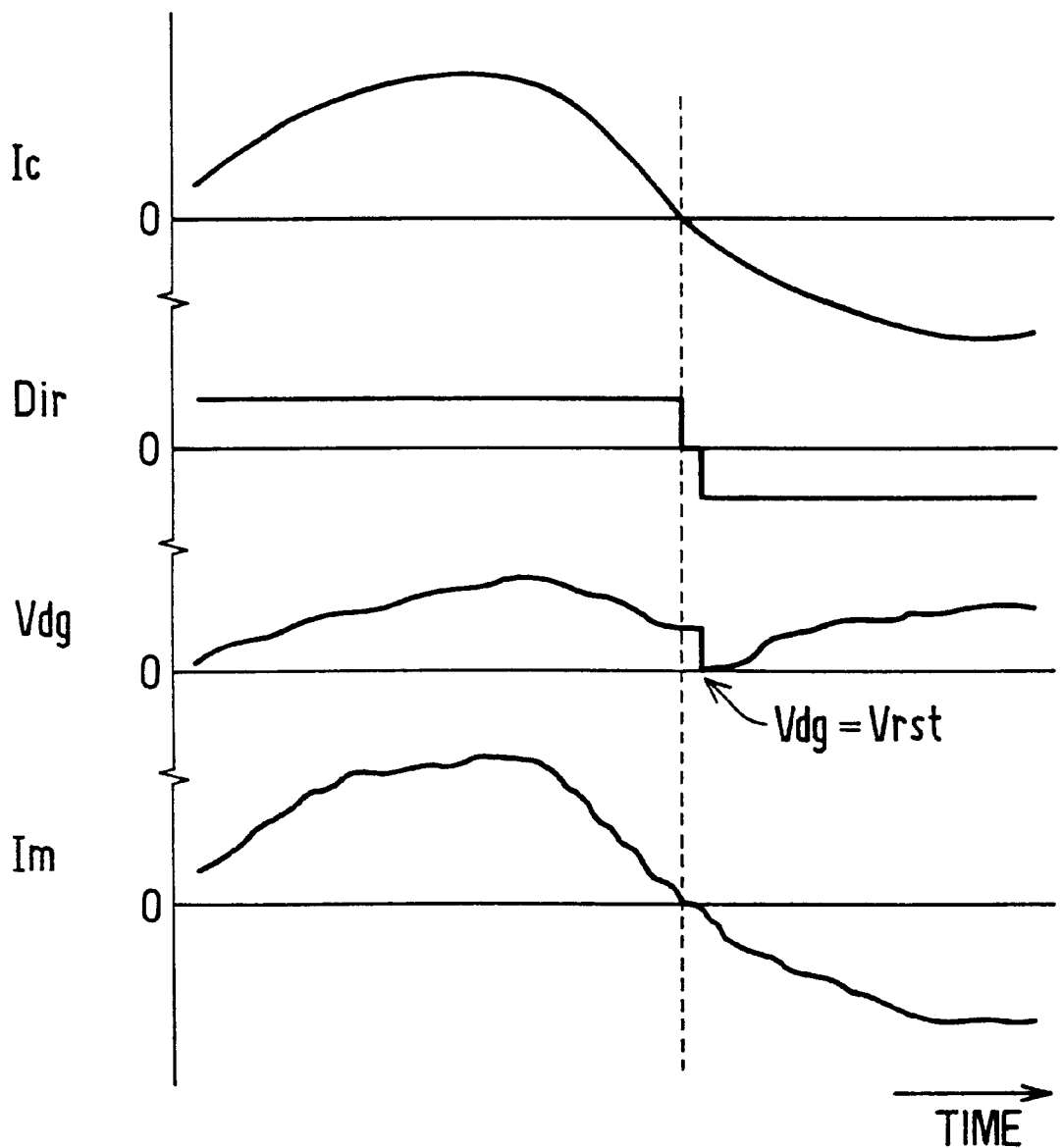
FIG. 5 is a graph demonstrating operation of the P.A. motor drive unit according to the first embodiment.

As shown in FIG. 5, if the symbol of the command current value Ic is changed from the positive to the negative, the limited drive voltage Vdg is reset to zero as soon as the direction command value Dir is changed from 0 to −1. Subsequently, the duty ratio Dt is reset to zero to start PWM-control P.A. motor 3 at the duty ratio Dt=0 so that the detected current value Im gradually increases in the reversal direction. Since the feedback integral term is zero, a large impulsive drive current Im will not flow in P.A. motor 3.

A fail-safe function that detects an abnormality of the drive current Im can be provided to reduce erroneous operation, thereby improving safety and the feeling of the steering.

Variation 1 of First Embodiment

Figure 6:
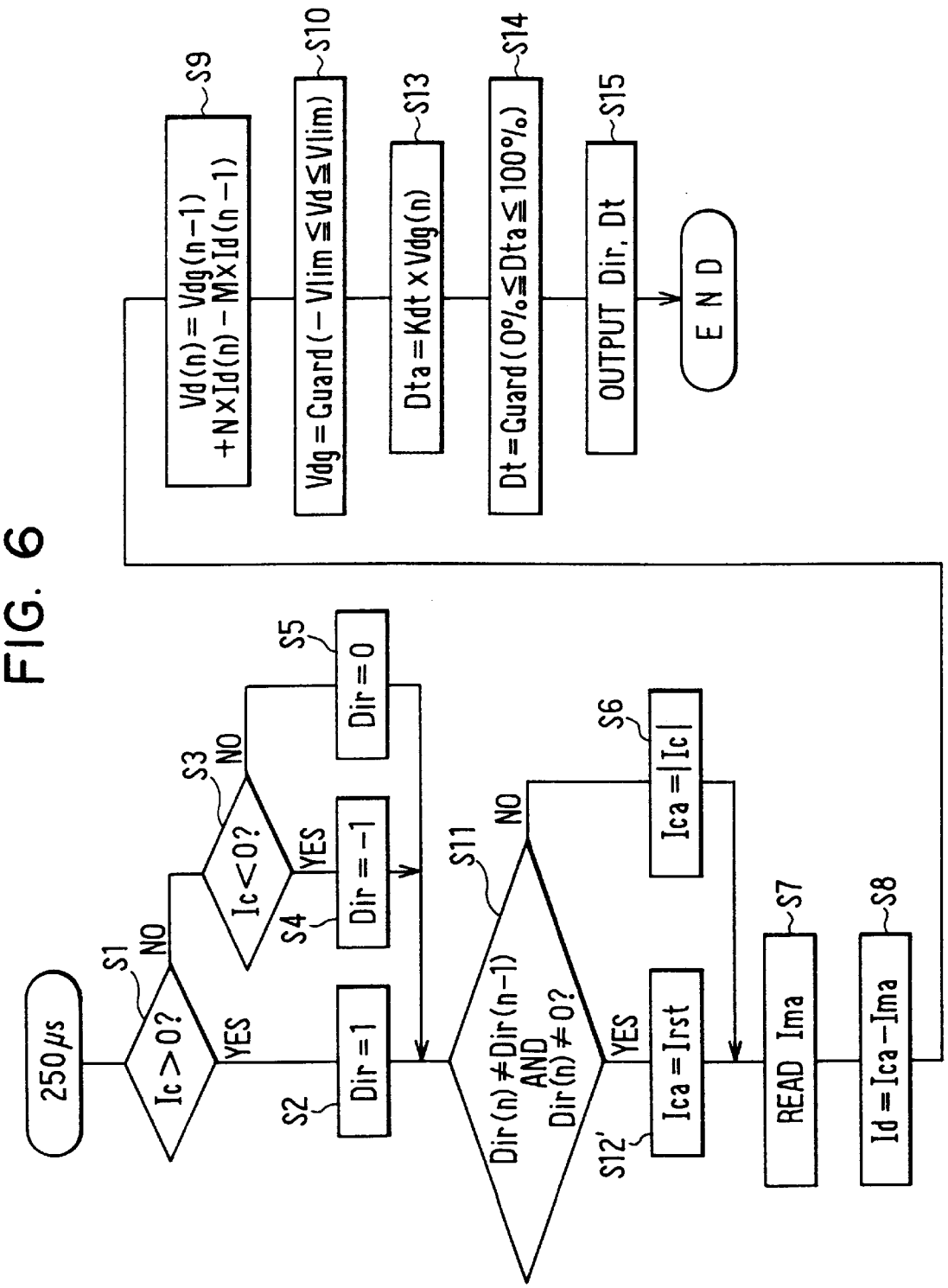
FIG. 6 is a flow diagram of a control logic of a P.A. motor drive unit according to a variation 1 of the first embodiment.

A variation of the first embodiment is described with reference to a flow diagram shown in FIG. 6.

This variation has different control logic for a digital operation performed by microcomputer 111 of current control unit 20. Therefore, it can be changed by easily replacing the software from the original control logic of the first embodiment.

Accordingly, just after the direction command operation performed at steps S1–S5, the absolute value Ica of the command current value is reset to a reset current value Irst when the command current value Ic is inverted. The reset current value Irst is set to a certain large negative value compared to the maximum drive current. For example, the reset current value could be −20 A.

If the direction command value Dir is not zero and different from the last, Ica=Irst is set at step S12'. Otherwise, Ica=|Ic| is set at step S6. In other words, the command current value Ica is forcibly reset to a certain negative value so that the output of PI feedback control means 25 can be zero when the steering wheel is reversed.

Since the reset current value Irst is set to a certain large negative value by comparing it with the maximum drive current, the current deviation Id=Ica−Ima becomes a large negative value just after the reset at the next step S8. Accordingly, the drive voltage Vd defined by the formula F1 becomes small at step S9. Since the newly calculated drive voltage Vd renews the next limited drive current Vdg, the same result as the result when the limited drive voltage Vdg is reset can be expected as in the first embodiment.

Variation 2 of the First Embodiment

Figure 7:
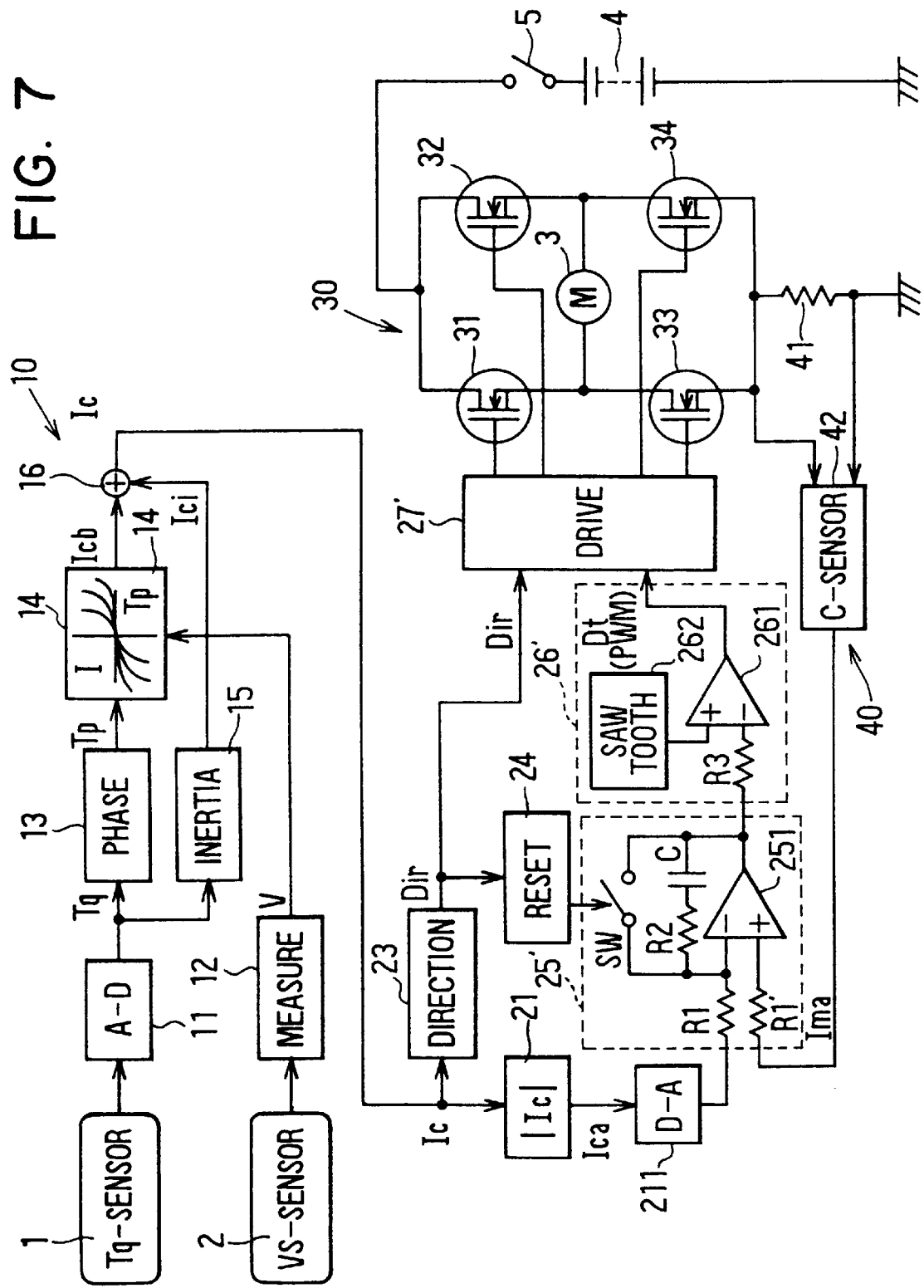
FIG. 7 is a block diagram of a power steering apparatus according to a variation 2 of the first embodiment.
Figure 8:
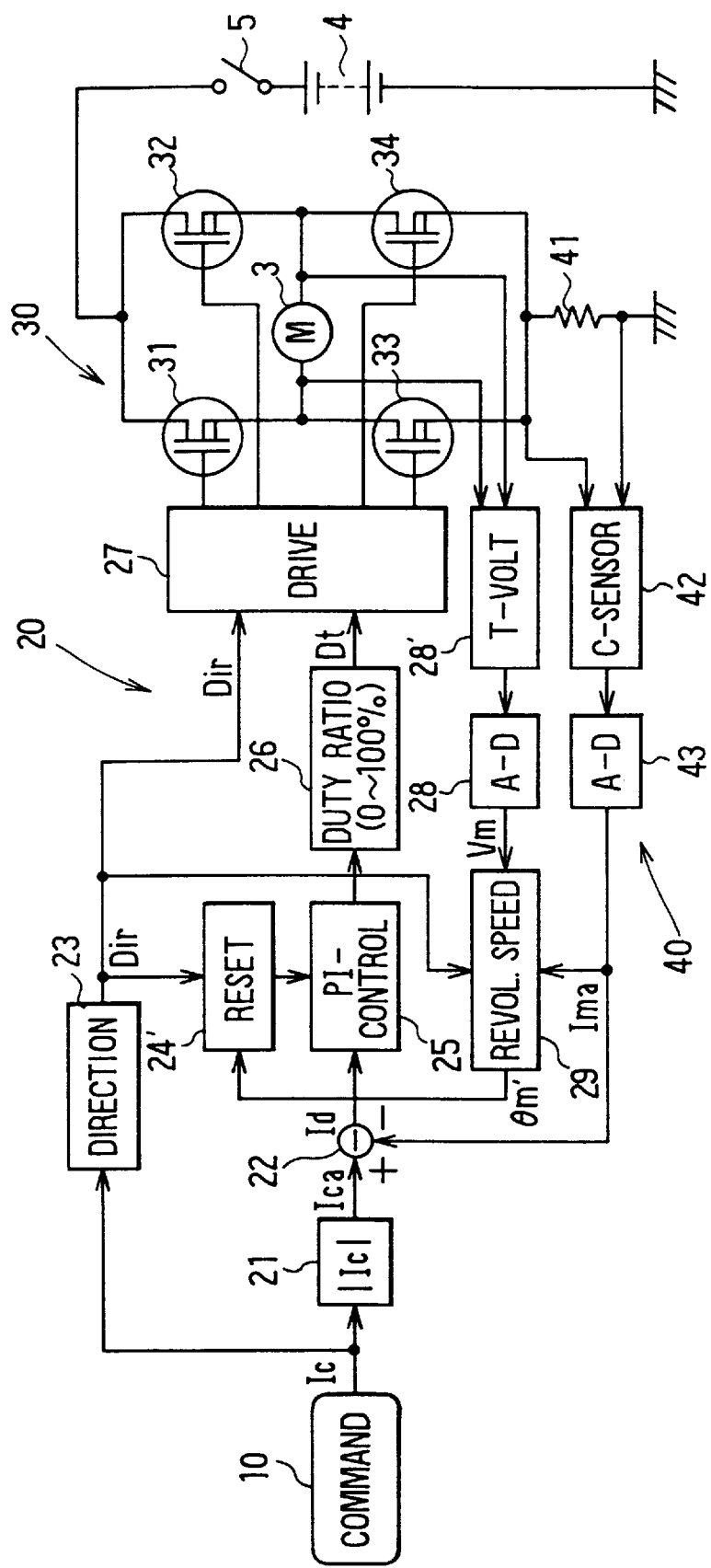
FIG. 8 is a block diagram of a main portion of a power steering apparatus according to a second embodiment of the invention.

As shown in FIG. 7, an analog circuit replaces a part of current control unit 20 of the power steering control apparatus. PI control means 25 of the first embodiment is replaced by analog PI control means 25', and duty ratio operation means 26 is replaced by analog duty ratio circuit 26'.

The absolute value of a detected current value Ima is supplied to PI control operation circuit 25' from current detecting unit 40. PI control operation circuit 25' is comprised of reset switch SW, input resistors R1, R1', feedback resistor R2, feedback capacitor C, and operational amplifier 251. Reset switch SW normally opens. It closes only in moments when the reset signal is supplied by compensation term reset means 24. Duty ratio set circuit 26' is comprised of input resistor 3, comparator 261, and saw-tooth-wave circuit 262.

If reset switch SW of PI control operation circuit 25' opens then the PI feedback control is carried out. In the PI control analog system a ratio R2/R1 between feedback resistor R2 and input resistor R1 corresponds to a proportional gain, and a reciprocal number 1/(R1 C) of the product of feedback capacity and input resistor R1 corresponds to the integral gain. In duty ratio set circuit 26', the output voltage of operational amplifier 251 and the output current of saw-tooth-wave circuit 262 are compared by comparator 261 to provide the PWM signal that corresponds to the duty ratio. Subsequently, the direction command value Dir and the PWM signal are supplied to drive circuit 27' so that the drive circuit 27' controls the H-bridge circuit 30 to drive the P.A. motor 3.

If reset switch SW of PI control operation circuit 25' is closed, for example, when the symbol of the command current value Ic changes from one to the other, feedback resistor R2 and feedback capacitor C are short-circuited momentarily so that the electrical charge of the capacitor, which corresponds to the integral value, is discharged to zero. This prevents the impulsive drive current. Thereafter, if the direction command value Dir is constant, reset signal SW remains open so that the duty ratio Dt is gradually increased by the PI operation. As a result, P.A. motor 3 can be smoothly driven by the drive current that is highly responsive to the command current value Ic.

Second Embodiment

A motor-assisted power steering control apparatus according to a second embodiment of the invention is described with reference to FIGS. 8–12.

Judgment of compensation term reset means 24' is made according to the rotation direction of P.A. motor 3, in addition to direction command value Dir.

Figure 9:
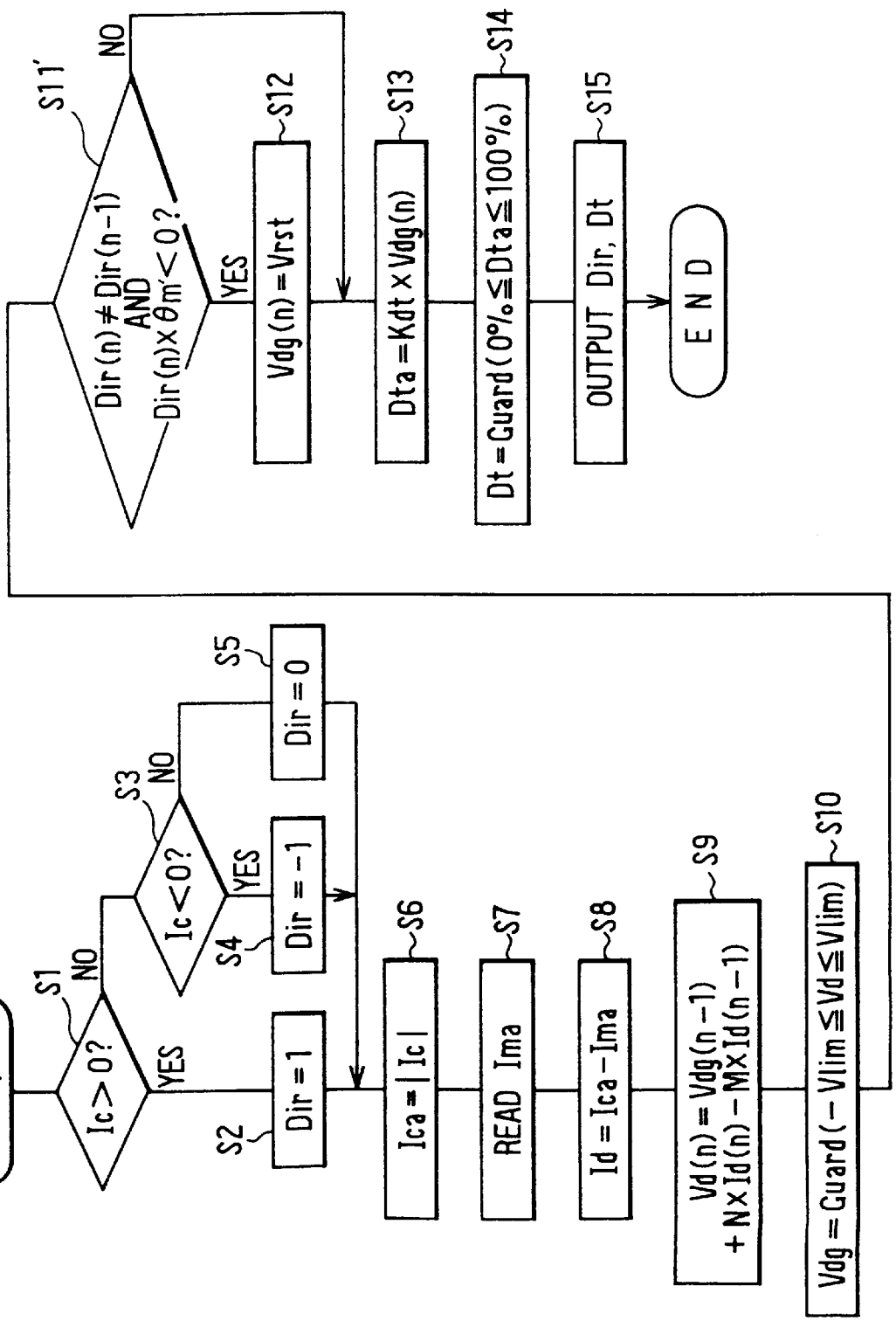
FIG. 9 is a flow diagram showing a control logic of the P.A. motor drive unit according to the second embodiment.

The power steering apparatus according to the second embodiment includes operational amplifier 28' as terminal voltage detecting means, A-D converter 28, and revolution speed operation means 29 in addition to the parts and elements of the first embodiment. As shown in FIG. 9, the control logic of compensation term reset operation means 24' additionally has judging step S11'. The operation of P.A. motor 3 is determined as being changed not only if the symbol of the command current value Ic changes between positive and negative, but also if the rotation direction Dir of the command current value Ic is different from the actual rotation direction of P.A. motor 3.

Operational amplifier 28' detects the voltage across a pair of terminals of P.A. motor 3 and sends the output voltage Vm to revolution speed operation means 29 of microcomputer 111 via A-D converter 28. Microcomputer ill calculates revolution speed θm' of P.A. motor 3 at revolution speed operation means 29 and sends it to compensation term reset means 24'. Revolution speed θm' is calculated by the following formula F3 on the basis of the terminal voltage Vm and the detected current value Ima.

Figure 10:
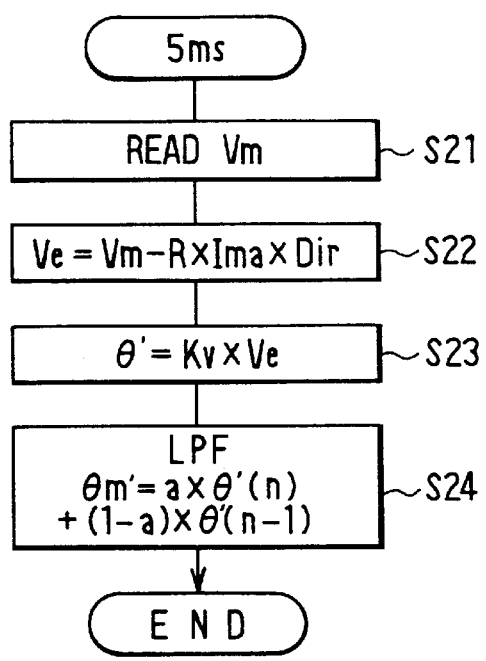
FIG. 10 is a flow diagram of calculating reduction in the number of motor revolutions in the second embodiment.
Figure 11:
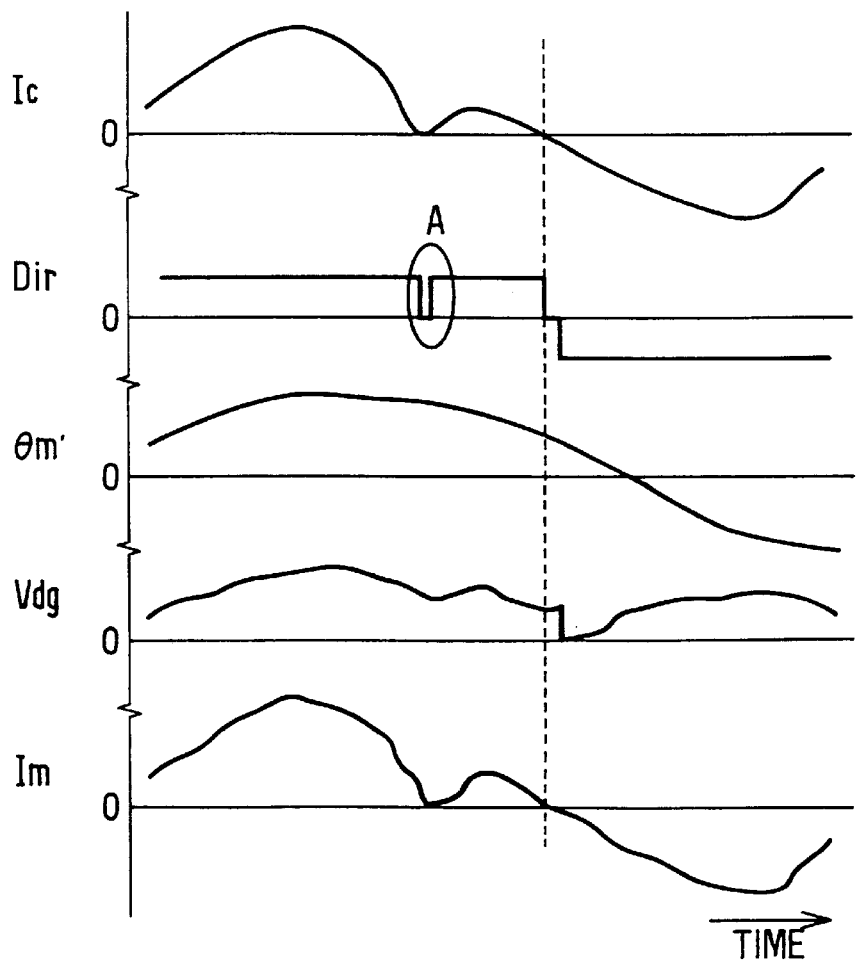
FIG. 11 is a graph demonstrating operation of the P.A. motor drive unit according to the second embodiment.

[F3] θm'=Kv (Vm−R Ima Dir), where Kv is a constant that corresponds to the reciprocal of an induced voltage constant, R is a circuit resistance of P.A. motor 3 and wire harnesses thereof. Revolution speed operation means 29 includes a digital low-pass filter (not shown), which removes noises from the signal of revolution speed θm' of P.A. motor 3 stepwise at steps S21–S24, as shown in FIG. 10.

The compensation term reset means 24' determines whether the compensation term is reset or not by judging the revolution speed θm' and rotation direction command value Dir at judging step S11'. In other words, as soon as the direction command signal Dir changes to the direction opposite the actual rotation direction of P.A. motor 3 (which can be detected by the positive or negative symbol of the motor revolution number θm'), the limited drive voltage Vdg is reset to the reset voltage Vrst (=0).

The control logic of this embodiment is the same except the judging step S11'. As shown by arrows in FIG. 11, if the symbol of the command current value Ic is inverted to change the direction command value Dir, the limited drive voltage Vdg is reset to the reset voltage Vrst (zero). As a result, even if the symbol of the command current value Ic is inverted, an impulsive large current caused by the counter electromotive force due to reversal of P.A. motor 3 can be prevented. As shown in circle A, if the direction command value Dir rises again after it drops to zero without further dropping to the negative the limited drive voltage Vdg is not reset to zero. Because P.A. motor 3 rotates in the same direction due to the inertia thereof, the symbol of the motor revolution speed θm' is not inverted so that the symbol of the direction command value Dir is not changed. In other words, if the direction command value Dir returns from zero without inverting the symbol thereof, the limited drive voltage Vdg is not reset, and a high degree of limited drive voltage Vdg is maintained to balance the counter electromotive force of P.A. motor 3. As a result, if the current command value Ic becomes zero for a while, the drive current Im follows at a high response characteristic, thereby preventing the operation of P.A. motor 3 from delaying.

Figure 12:
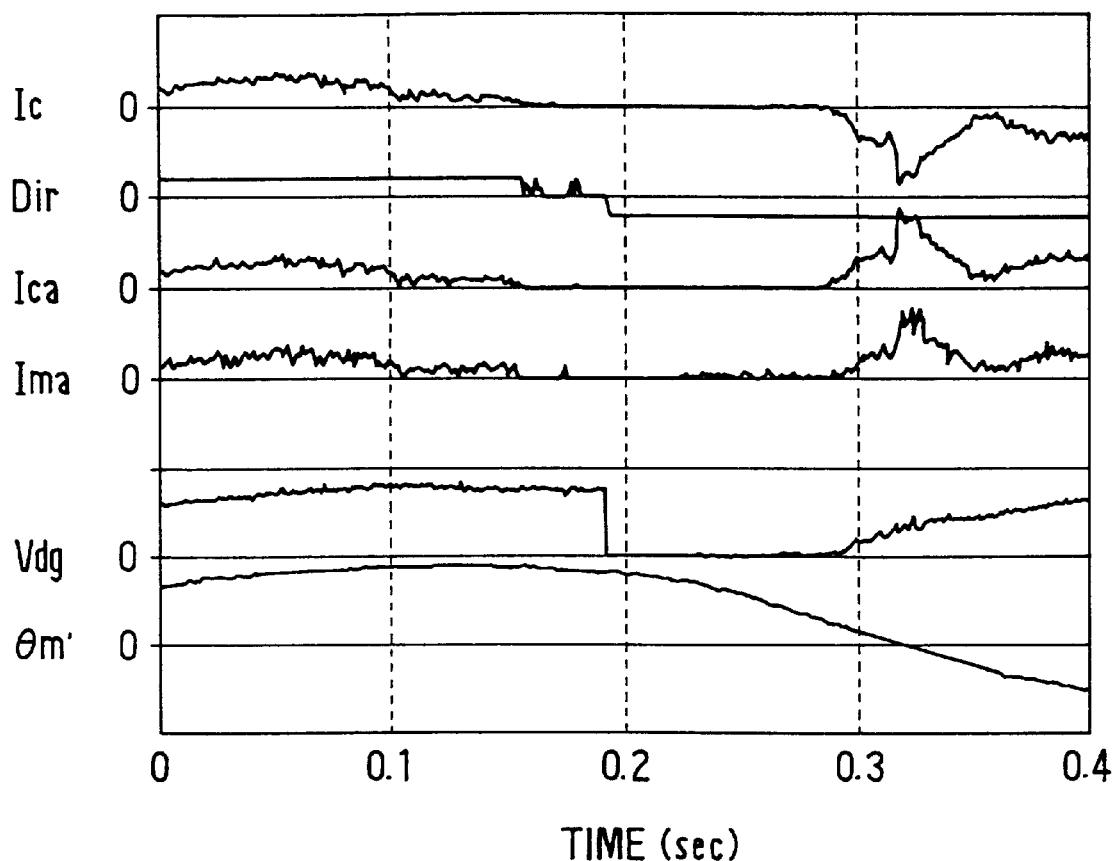
FIG. 12 is a graph demonstrating operation of the second embodiment.

A test result of a vehicle equipped with the motor-assisted power steering control apparatus according to this embodiment is shown in FIG. 12. It was found from the data that the limited drive voltage Vdg is not reset if the direction command signal Dir returns from zero. Therefore, no impulsive current is generated in the detected current value Ima. As a result, revolution speed θm' of the motor can be controlled smoothly.

This power steering control apparatus provides not only the same effect as the first embodiment, but also, the effect that a driver does not feel a "draggingg" of the steering wheel even if the command current value Ic returns after it becomes zero.

Variation 1 of Second Embodiment

As a variation 1 of this embodiment, the above described reset value Vrst is changed to balance the counter electromotive force of the P.A. motor 3.

If the symbol of the command current value Ic is inverted, the limited drive voltage Vdg is reset to the reset voltage Vrst as in the second embodiment. However, the reset value Vrst changes as the counter electromotive force Ve of P.A. motor 3 changes in this variation. The counter electromotive force Ve is expressed in the following formula, as shown in FIG. 10 at step S22.

[F4] Ve=Vm−R Ima Dir, where R is a resistance of P.A. motor 3 and the wire harnesses thereof.

The reset voltage value Vrst, which corresponds to the counter electromotive force Ve, is expressed in the following formula.

[F5] Vrst=Ve Dir For example, if the direction command value Dir changes from 1 to −1 while the symbol of revolution speed θm' of the motor is positive, the symbol of the counter electromotive force Ve is positive. Since Dir is −1, the reset voltage value Vrst becomes negative, that is −Ve. Accordingly, the duty ratio Dt is set to 0% so that the impulsive current can be eliminated. On the other hand, if the direction command value Dir changes from −1 to 1 while the symbol of revolution speed θm' of the motor is negative, the symbol of the counter electromotive force Ve is negative. However, the reset voltage value Vrst has negative symbol, and the duty ratio Dt is also set to 0%.

Occasionally, the direction command signal Dir may be changed to 1 while revolution speed θm' of the motor is positive, or it may be changed to −1 while revolution speed θm' of the motor is positive. Since revolution speed θm' of the motor and the direction command value Dir is the same in symbol, the limited drive voltage Vdg is not reset. Thus, the limited drive voltage Vdg is continuously maintained to balance the counter electromotive force of P.A. motor 3 so that an excellent response characteristic of the drive current Im to the command current value Ic can be provided.

Thus, if the counter electromotive force Ve is induced in P.A. motor 3, the limited drive voltage Vdg is reset to a voltage that can balance the counter electromotive force. Consequently, the duty ratio Dt is set to 0%, and the driving torque of P.A. motor 3 disappears, so that the operation of P.A. motor 3 can be changed smoothly.

Variation 2 of Second Embodiment

The limited drive voltage Vdg is reset either when P.A. motor 3 is turned on by the ignition switch or operated after it was stopped by the fail safe means due to an abnormal operation.

Figure 13:
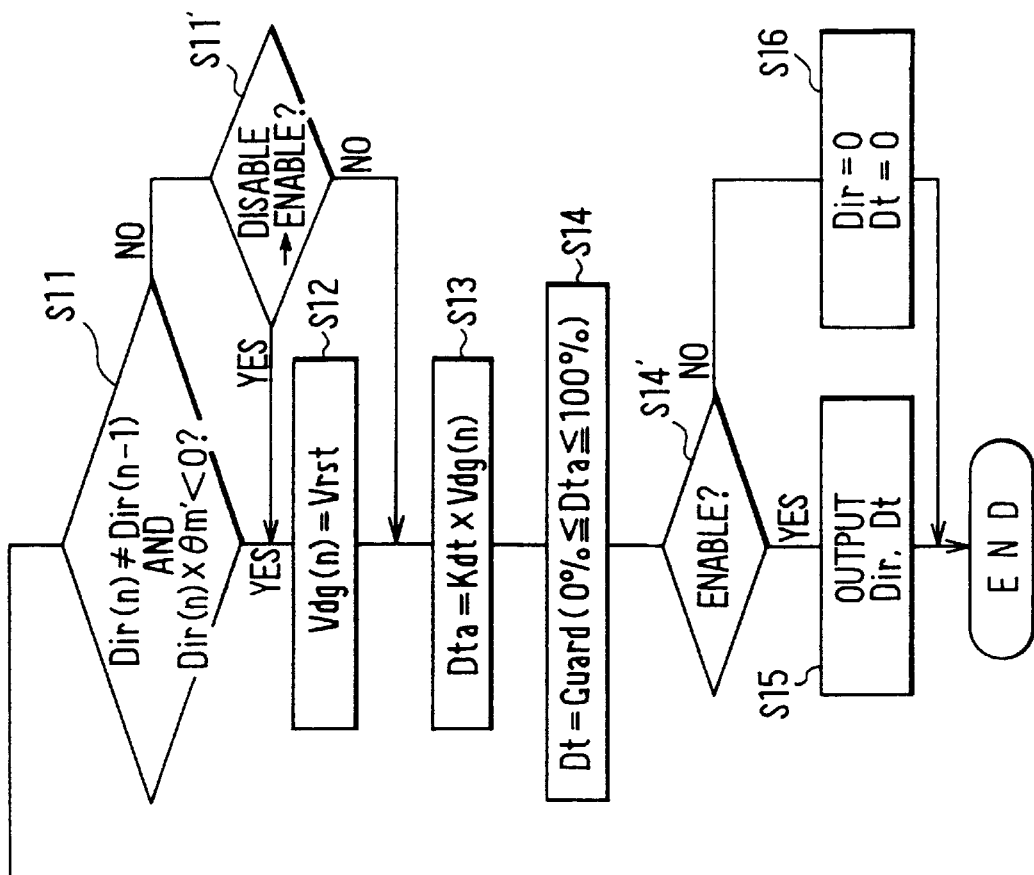
FIG. 13 is a flow diagram showing a control logic of the P.A. motor drive unit according to a variation 2 of the second embodiment.
Figure 13:
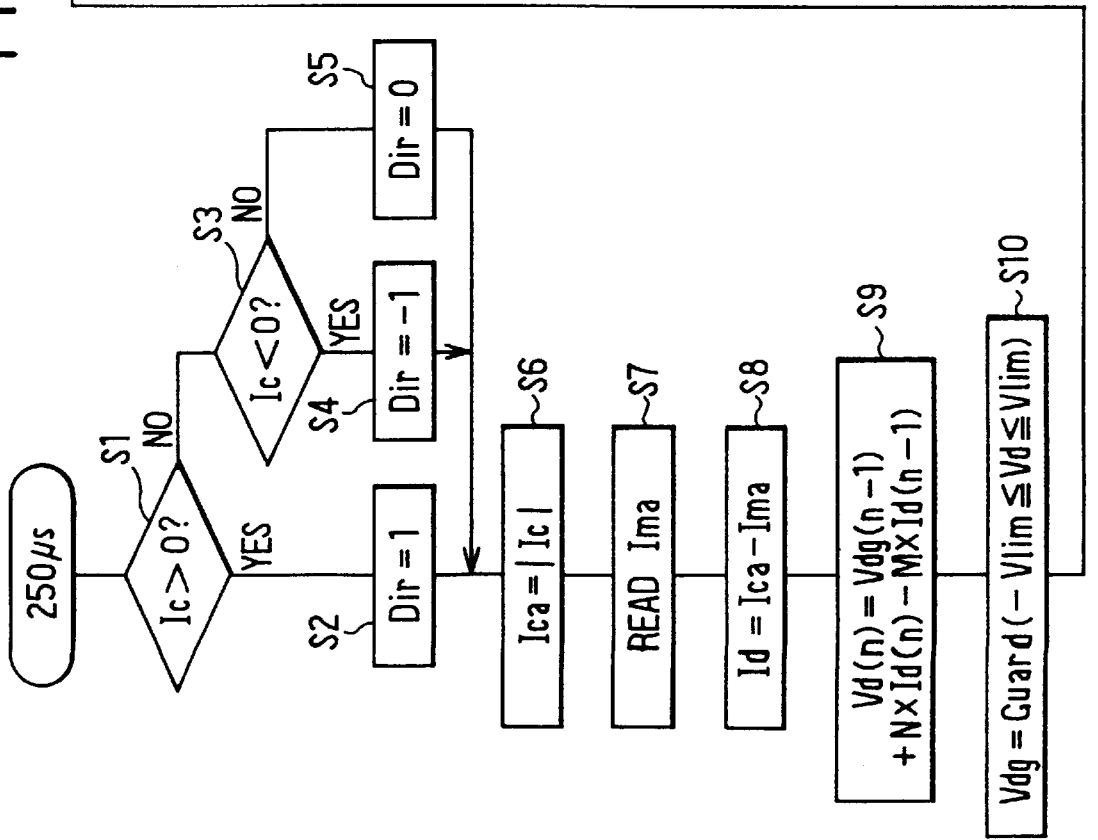

The power steering control apparatus has substantially the same structure as the second embodiment except a modified judgment logic of compensation term reset means 24'. As shown in FIG. 13, the main control logic includes a judgment step S11' in addition to the control logic of the second embodiment. In the judgment step S11', the limited drive voltage Vdg is reset to an enable condition when P.A. motor 3 is recovered from a disable condition after an abnormal condition was detected when the system of the motor-assisted power steering apparatus is checked.

Therefore, an excessive impulsive drive current Im can be more surely prevented. Since the driving torque of P.A. motor 3 is gradually recovered, a driver can be prevented from over-rotating the steering wheel due to his careless operation. The steering can also be carried out comfortably even when the motor control is recovered from an abnormal condition.

Figure 14:
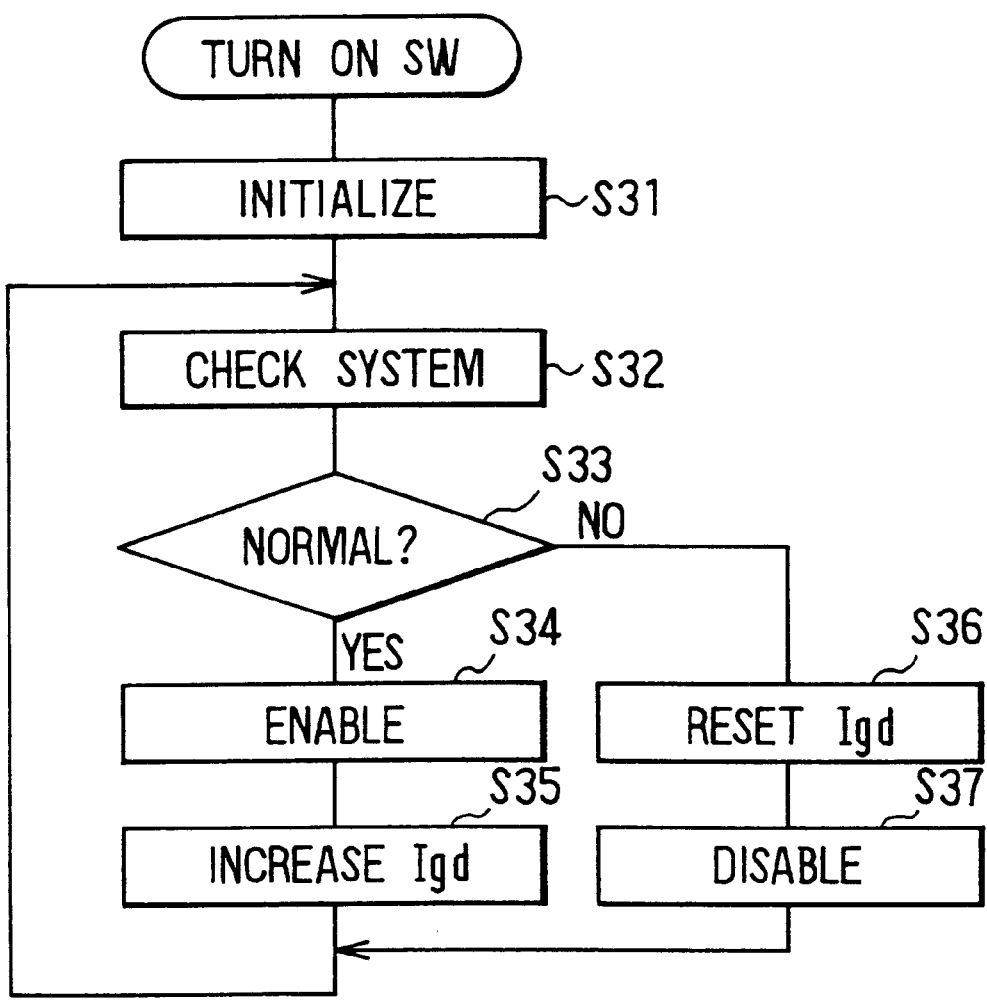
FIG. 14 is a flow diagram of a self diagnosis logic according to the variation 2 of the second embodiment.

As shown in FIG. 14, a self-diagnosis logic is installed in CPU 111 for the system check. When the ignition switch is turned on, the system is initialized at step S31 before other systems. That is, a memory of microcomputer 100 and interruption steps including the interruption of the above-stated control logic are initialized, and P.A. motor 3 is initialized to the disable condition.

Thereafter, a routine of system check steps S32–S37 is carried out at a prescribed cycle. At step S32, whether the steering torque signal Tq is normal or not and whether the detected current value Ima is normal or not are judged together with other judgments. Thereafter, whether there is any abnormal condition or not is judged at step S33 according to the above results. If no abnormal condition is found at step S33, a judge flag is raised to permit P.A. motor 3 to operate at step S34 (Enable). Each time the system check routine is repeated, the limited current value Igd that is the limited value of the drive current Ima is gradually increased until the limited current value Igd reaches a preset normal value at step S35. On the other hand, if abnormal condition is judged at step S33, the limited current value Idg is immediately set to 0 to prevent a runaway of P.A. motor 3 at step S36, and the judge flag is lowered to zero to stop P.A. motor 3 at step S37 (Disable).

In the control logic shown in FIG. 13, whether the judging flag is changed from the disable condition to the enable condition is examined at step S11'. If the judging flag is changed from the disable condition to the enable condition, the limited drive voltage Vdg is reset to the reset voltage Vrst so that the duty ratio Dt becomes 0%. Therefore, P.A. motor 3 gradually operates so that the driving torque of P.A. motor 3 gradually increases. As a result, abrupt change, which would otherwise frighten a driver can be prevented effectively.

Figure 15:
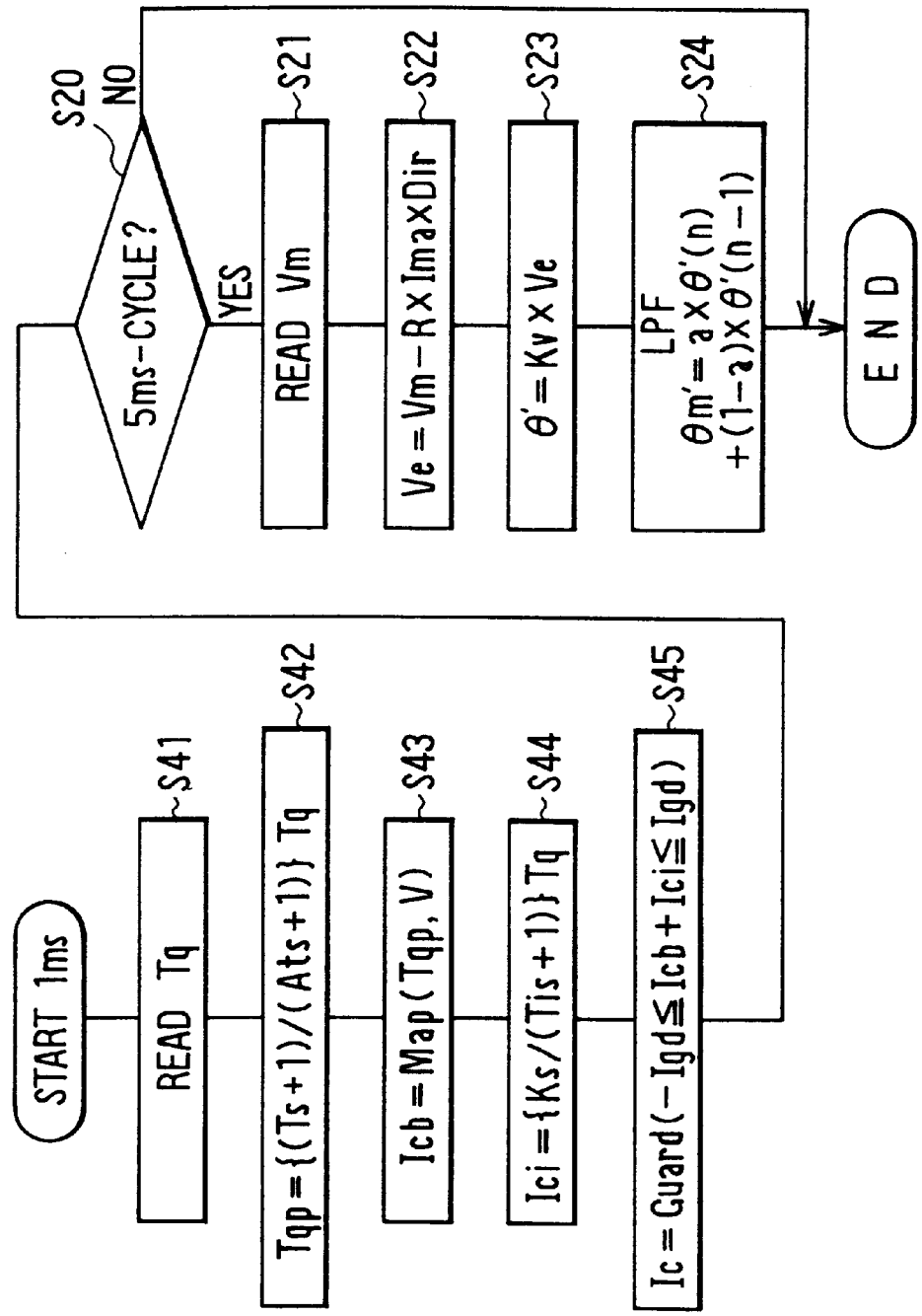
FIG. 15 is a flow diagram of a temporary operation logic according to the variation 2 of the second embodiment.

The operation of command current value unit 10 is controlled according to the flow diagram shown in FIG. 15.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A motor drive unit for driving a power assist motor according to a command current value including:

drive means including an H-bridge circuit connected to said power assist motor for supplying PWM-controlled drive current;

current detecting means for providing an actual current value by detecting said drive current; and current control means for carrying out a PI feed back control according to difference between the absolute values of said command current value and said actual current value, thereby controlling said H-bridge circuit, wherein said current control means comprises:
      PI operation control means for providing a PI control equation having an integral compensation term; and
      compensation-term-operation means for resetting said integral compensation term to a suitable value when operation of said power assist motor is changed from one state to another.

2. The motor drive unit as claimed in claim 1 wherein said change of operation of said power assist motor is judged by a change of the symbol of said command current value.

3. The motor drive unit as claimed in claim 1, wherein said change of operation is detected when the symbol of said command current value is changed and the direction of said command current value is different from a current value to rotate said motor in one direction.

4. The motor drive unit as claimed in claim 2, wherein said change of operation is at least one of starting operation of said power assist motor after drive current is supplied thereto and re-starting operation of said power assist motor after said power assist motor is stopped due to an abnormal operation.

5. The motor drive unit as claimed in claim 1, wherein said reset value is smaller than a predetermined positive value.

6. The motor drive unit as claimed in claim 5, wherein said reset value is larger than a predetermined negative value.

7. The motor drive unit as claimed in claim 1, wherein said reset value is a value opposite in direction to a voltage induced in said power assist motor.

8. A power assist control apparatus for a vehicle having a steering wheel comprising:

command current operation means for providing said command current value according to a detected steering torque applied to a steering shaft and a detected speed of said vehicle;

said motor drive unit claimed in claim 1; and a power assist motor for increasing torque for steering said steering wheel.

* * * * *